(12) United States Patent
Krishnamurthy et al.

(10) Patent No.: US 10,841,559 B2
(45) Date of Patent: Nov. 17, 2020

(54) SYSTEMS AND METHODS FOR DETECTING IF PACKAGE WALLS ARE BEYOND 3D DEPTH CAMERA RANGE IN COMMERCIAL TRAILER LOADING

(71) Applicant: SYMBOL TECHNOLOGIES, LLC, Lincolnshire, IL (US)

(72) Inventors: Adithya H. Krishnamurthy, Hicksville, NY (US); Justin F. Barish, Kings Park, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 217 days.

(21) Appl. No.: 15/853,163

(22) Filed: Dec. 22, 2017

(65) Prior Publication Data
US 2019/0199999 A1    Jun. 27, 2019

(51) Int. Cl.
*H04N 13/204* (2018.01)
*G06T 7/593* (2017.01)
*G01B 11/00* (2006.01)
*H04N 9/04* (2006.01)
*H04N 13/00* (2018.01)

(52) U.S. Cl.
CPC ........... *H04N 13/204* (2018.05); *G01B 11/00* (2013.01); *G06T 7/593* (2017.01); *H04N 9/045* (2013.01); *G06T 2207/10012* (2013.01); *G06T 2207/10028* (2013.01); *H04N 2013/0081* (2013.01); *H04N 2013/0092* (2013.01)

(58) Field of Classification Search
CPC ......... H04N 13/204; H04N 2013/0081; H04N 2013/0092; G06T 7/593; G06T 2207/10028; G06T 2207/10012
USPC .............................................. 348/46
See application file for complete search history.

(56) References Cited

U.S. PATENT DOCUMENTS

| | | | | |
|---|---|---|---|---|
| 9,460,524 B1 * | 10/2016 | Curlander | ............. | G06Q 10/08 |
| 2014/0036072 A1 * | 2/2014 | Lyall | ................. | G06K 9/00771 |
| | | | | 348/143 |
| 2014/0146041 A1 * | 5/2014 | Jeon | ...................... | H04N 13/128 |
| | | | | 345/419 |
| 2014/0372183 A1 * | 12/2014 | Groble | .................. | G06Q 50/28 |
| | | | | 705/7.38 |
| 2015/0278720 A1 * | 10/2015 | Nye | ...................... | G06Q 10/063 |
| | | | | 705/7.11 |
| 2016/0297361 A1 * | 10/2016 | Drazan | ................. | H04N 7/181 |
| 2017/0064305 A1 * | 3/2017 | Fu | ............................ | G06T 5/005 |

(Continued)

*Primary Examiner* — Loi H Tran
(74) *Attorney, Agent, or Firm* — Yuri Astvatsaturov

(57) ABSTRACT

Three-dimensional (3D) depth imaging systems and methods are disclosed for use in commercial trailer loading. In various aspects, a 3D-depth camera is configured and oriented in a direction to capture 3D image data of a vehicle storage area. A depth-detection application (app) executing on one more processors determines, based on the 3D image data, a void data region, and a floor data region within the 3D image data. Based on the determination of the void data region and the floor data region, the depth-detection app generates an out-of-range indicator that indicates that a wall (e.g., a package wall) situated at a rear section of the vehicle storage area is not detected. The determination that a package wall is not detected causes a dashboard app to modify a graphical representation of the capacity of the vehicle storage area.

28 Claims, 9 Drawing Sheets
(2 of 9 Drawing Sheet(s) Filed in Color)

(56) References Cited

U.S. PATENT DOCUMENTS

2017/0178333 A1* 6/2017 Zhang .................. G06Q 10/083
2018/0033145 A1* 2/2018 Schoenberg .............. G06T 7/80
2019/0108396 A1* 4/2019 Dal Mutto ......... G06K 9/00771

* cited by examiner

SYSTEMS AND METHODS FOR DETECTING IF PACKAGE WALLS ARE BEYOND 3D DEPTH CAMERA RANGE IN COMMERCIAL TRAILER LOADING

BACKGROUND OF THE INVENTION

Three-dimensional (3D) cameras may be used to determine distances from the camera to objects positioned in the vicinity of the camera. Typical 3D cameras have limited ranges, such as certain number of feet, before the camera can no longer reliably detect or sense surfaces or objects. For example, in situations requiring the sensing of surface areas within a large storage area, such as a storage area of a commercial trailer, the length of the storage area may extend beyond the detecting or sensing range of a 3D camera positioned therein. This can create problems because the 3D camera would not be able to detect or sense specific features of the storage area, and, therefore, could fail to provide reliable data. Moreover, the storage area may include moving objects, such as people, packages being moved, loading vehicles, etc., that may cause the 3D camera to produce inaccurate data regarding the size or dimensions of the storage area. Such inaccurate data can be especially problematic for end-use applications that rely on the data to perform calculations or other data manipulations for facilitating depth or other 3D determinations.

Accordingly, there is a need for depth imaging systems and methods for use in commercial trailer loading.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
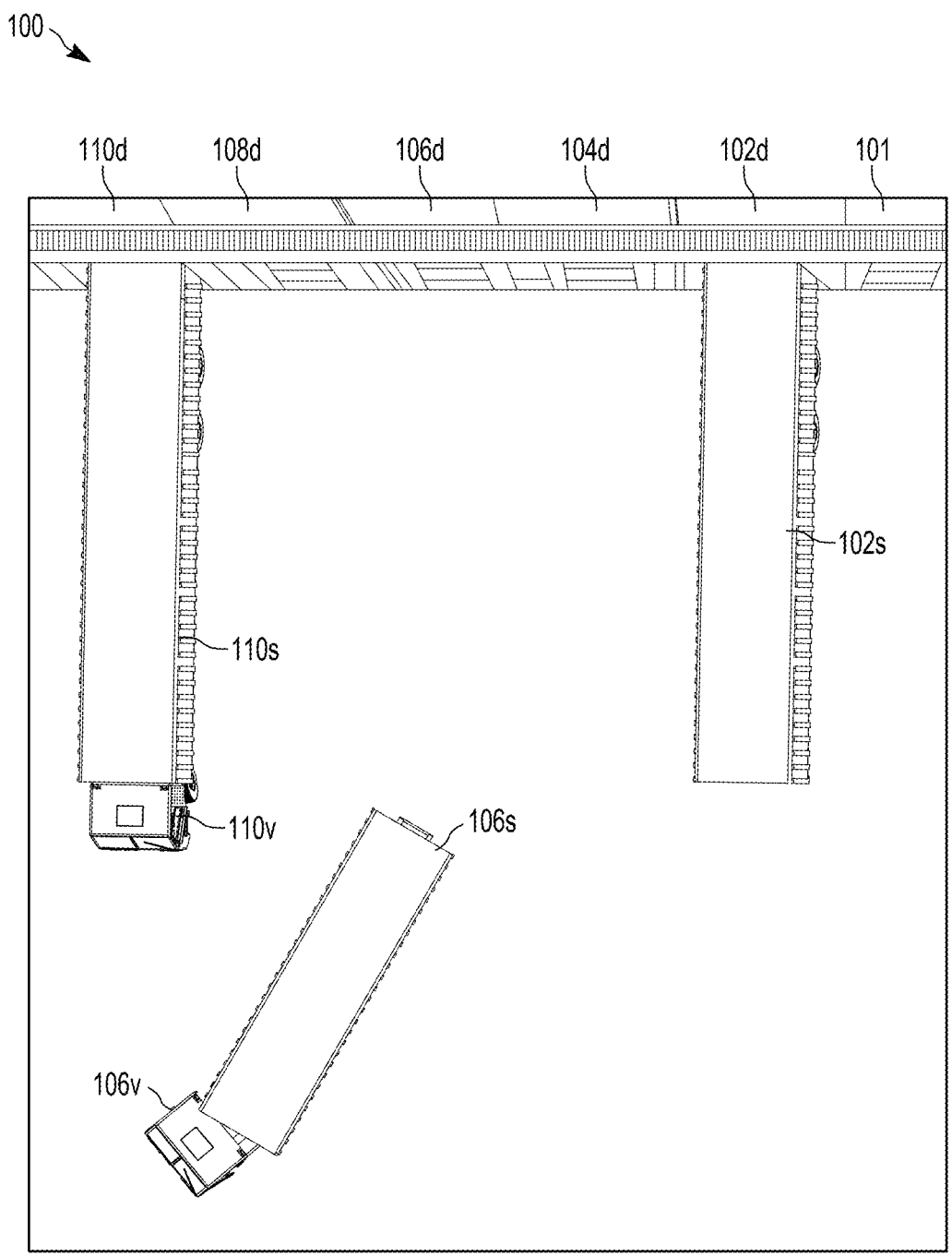
FIG. 1 is a perspective view, as seen from above, of a loading dock including a loading facility, a plurality of docking bays, a plurality of vehicles, and a plurality of vehicle storage areas, in accordance with example embodiments herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Systems and methods are disclosed herein that allow for determining when package walls, e.g., as packed within commercial trailers, are located outside of the range of a 3D-depth camera. The systems and methods improve the accuracy of fullness and capacity diagnostics associated with trailer loading and unloading as described herein. The disclosed techniques allow for more accurate reporting and display of vehicle capacity and fullness data, and, thereby, reduce false positives, or other inaccurate data and reporting, e.g., in graphical representations of a vehicle storage area, as implemented by loading applications described herein.

Accordingly, in various embodiments disclosed herein, three-dimensional (3D) depth imaging systems and methods for use in commercial trailer loading are described. For example, a 3D-depth camera may be configured and oriented in a direction to capture 3D image data of a vehicle storage area. A depth-detection application (app) executing on one more processors may determine, based on the 3D image data, a void data region, and a floor data region within the 3D image data. Based on the determination of the void data region and the floor data region within the 3D image data, the depth-detection app may generate an out-of-range indicator that indicates that a wall (e.g., a package wall) situated at a rear section of the vehicle storage area is not detected. The determination that a package wall is not detected may cause a dashboard app, as described herein, to modify a graphical representation of the capacity value of the vehicle storage area.

FIG. 1 is a perspective view, as seen from above, of a loading dock 100 including a loading facility 101, a plurality of docking bays 102d-110d, a plurality of vehicles 106v and 110v, and a plurality of vehicle storage areas 102s-110s, in accordance with example embodiments herein. In some embodiments, loading dock 100 may, for example, be associated with a retail store, a wholesale store, or other such commercial building. In other embodiments loading dock 100 may be associated with a storage facility, or waypoint facility, for housing packages, boxes, or other transportable objects or goods typically involved in distribution and logistics of such transportable objects or goods. Additional embodiments are contemplated herein such that loading dock 100 accommodates the loading and unloading of transportable objects or goods at a store, a facility, or other such similar location.

For example FIG. 1 depicts loading facility 101, which, as described, may be a retail store, a storage facility, or other such similar location that accommodates the loading and unloading of transportable objects or goods. Loading facility 101 includes a plurality of docking bays 102d-110d. For example, docking bay 104d is depicted as undocked, and includes an opening of a size equal to or similar to that of an opening of a vehicle storage area. As depicted in FIG. 1, docking bay 104d may further include padding or insulation to receive a trailer (e.g., a vehicle storage area) against the wall of the loading facility 101. Docking bay 104d may further include a retractable door positioned within the opening of docking bay 104d, where the door may be opened to provide access to the vehicle storage area of a trailer from the loading facility 101. As described herein, docking bay 104d is representative of the remaining depicted docking bays, such as docking bays 102d, 106d, 108d, and 110d, where docking bays 102d, 106d, 108d, and 110d may have similar features or functionality as described herein for docking bay 104d.

In various embodiments, an opening of a vehicle storage area may be the opening of a trailer, where the trailer may be hauled by a semi, tractor-trailer, truck, or other such vehicle capable of hitching and moving a trailer (e.g., vehicle storage area), as described herein. In some embodiments the floor of a trailer, when docked, may be flush, or approximately flush, with the floor of a docking bay (e.g., docking bays 102d-110d) of loading facility 101.

FIG. 1 also depicts a plurality of vehicle storage areas 102s, 106s, and 110s. Vehicle storage areas 102s, 106s, and 110s may each be storage areas associated with a vehicle, for example, a trailer or other transportable storage area (e.g., 102s, 106s, and 110s) associated with a semi, tractor-trailer, truck, or other such large vehicle (e.g., 106v and 110v) as described herein. For example, as shown in FIG. 1, each of the vehicles 106v and 110v are associated with vehicle storage areas 106s and 110s respectively. Each of the vehicles 106v and 110v may be responsible for maneuvering their respective vehicle storage areas 106s and 110s to respective docking bays, such as docketing bays 106d and 110d.

As described herein, each of the vehicle storage areas 102s, 106s, and 110s include openings, generally at one end, that are of the same or similar size to the openings of the docking bays 102d-110d. In this way, the vehicle storage areas 102s, 106s, and 110s may interface with, or dock with, the docking bays 102d-110d in order to accommodate the loading and unloading of packages, boxes, or other transportable objects or goods as described herein. For example, as shown in FIG. 1, vehicle storage area 102s is depicted as a trailer that is docked with docking bay 102d. Accordingly, the opening of vehicle storage areas 102s interfaces with the opening of docking bay 102d such that the interior of vehicle storage areas 102s may be viewed or accessed from docking bay 102d. Similarly, vehicle storage area 110s is also depicted as a trailer that is docked with docking bay 110d, where the opening of vehicle storage areas 110s interfaces with the opening of docking bay 110d such that the interior of vehicle storage areas 110s may be viewed or accessed from docking bay 110d. Vehicle storage area 106s is depicted as currently not docked with respect to docking bay 106d.

Vehicle storage areas, such as 102s, 106s, and 110s, may have different sizes, lengths, or otherwise dimensions. For example, in one embodiment, the vehicle storage area 102s may be associated with a 63 foot long trailer, vehicle storage area may be associated with a 53 foot long trailer, and vehicle storage area 110s may be associated with a 73 foot long trailer. Other variations of vehicle storage area dimensions, sizes, and/or lengths are contemplated herein.

Figure 2A:
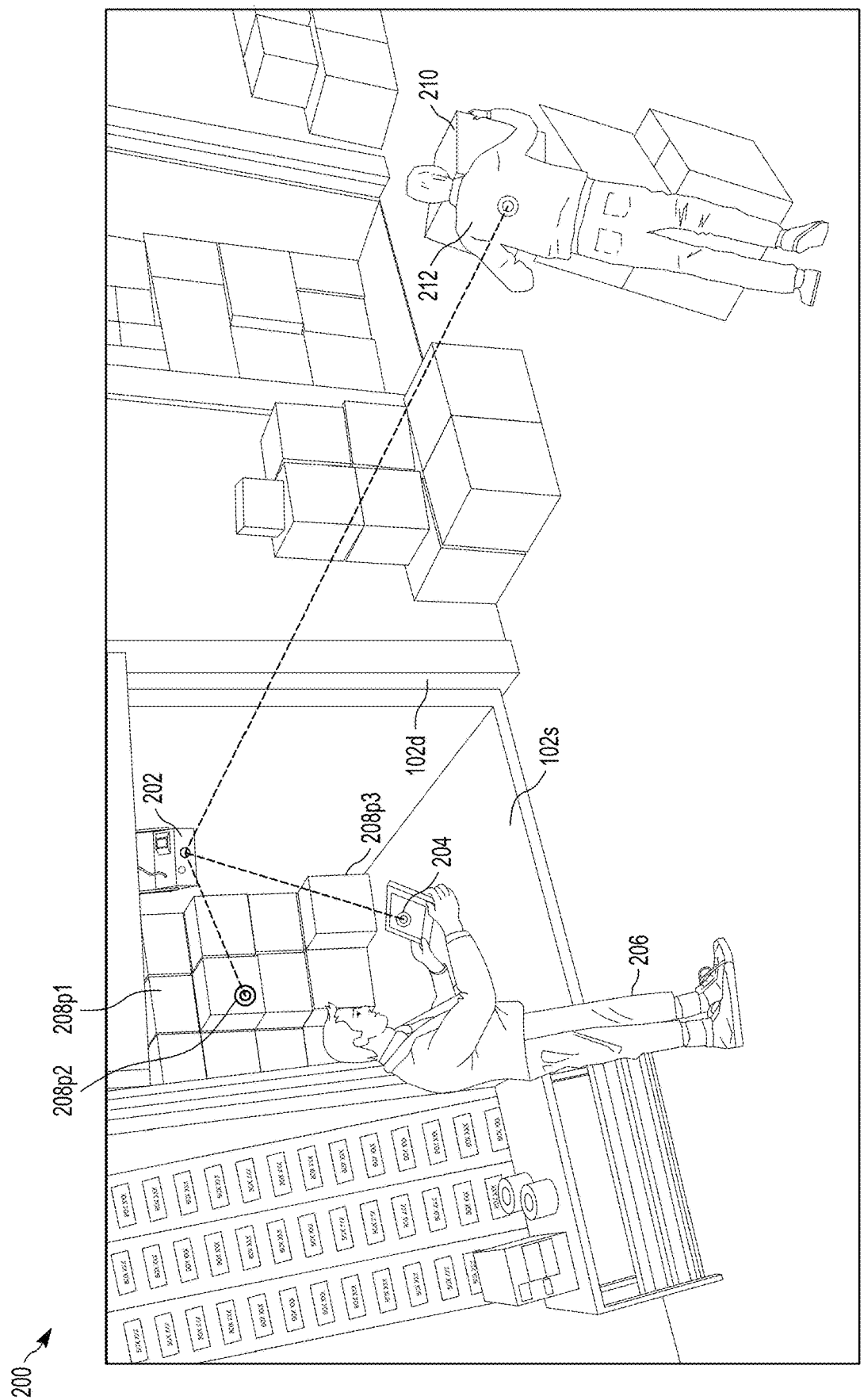
FIG. 2A is a perspective view of the loading facility of FIG. 1 depicting a vehicle storage area docked at a docking bay, in accordance with example embodiments herein.

FIG. 2A is a perspective view 200 of the loading facility 101 of FIG. 1 depicting vehicle storage area 102s docked at a docking bay 102d, in accordance with example embodiments herein. For example, FIG. 2A depicts vehicle storage area 102s, which in the embodiment of FIG. 2A is an interior view of the vehicle storage area 102s of FIG. 1. FIG. 2A also depicts docking bay 102d, which in the embodiment of FIG. 2A is an interior view of the docking bay 102d of FIG. 1. As depicted in FIG. 2A, vehicle storage area 102s is docked with docking bay 102d exposing the interior of vehicle storage area 102s to the interior of loading facility 101. Vehicle storage area 102s includes packages, boxes, and/or other transportable objects or goods, including packages 208p1-208p3, which may, in some embodiments, correspond to package walls, as described herein. The packages 208p1-208p3 may be in a state of being loaded or unloaded into vehicle storage area 102s. For example, worker 212 may be in a state of loading or unloading additional packages 210 into or out of vehicle storage area 102s. In some embodiments, manager 206 may oversee, assist, or otherwise additionally facilitate the loading or unloading packages, boxes, and/or other transportable objects or goods (e.g., packages 208p1-208p3 or 210) into or out of the vehicle storage area 102s. For example, manager 206 may utilize a dashboard app executing on client device 204 as described herein.

FIG. 2A also depicts a trailer monitoring unit (TMU) 202. TMU 202 may be a mountable device that includes a 3D-depth camera for capturing 3D images (e.g., 3D image data) and a photo-realistic camera (e.g., 2D image data). The photo-realistic camera may be an RGB (red, green, blue) camera for capturing 2D images. The TMU 202 may also include one or more processors and one or more computer memories for storing image data, and/or for executing apps that perform analytics or other functions as described herein. In various embodiments, and as shown in FIG. 2A, the TMU 202 may be mounted within loading facility 101 and oriented in the direction of vehicle storage area 102s to capture 3D and/or 2D image data of the interior of vehicle storage area 102s. For example, as shown in FIG. 2A, TMU 202 may be oriented such that the 3D and 2D cameras of TMU 202 look down the length of the vehicle storage area 102s so that TMU 202 may scan or sense the walls, floor, ceiling, packages (e.g., 208p1-208p3 or 210), or other objects or surfaces with vehicle storage area 102s to determine the 3D and 2D image data. The image data may be processed by the one or more processors and/or memories of the TMU 202 (or, in some embodiments, one or more remote processors and/or memories of a server) to implement analysis, functions, such as graphical or imaging analytics, as described by the one or more various flowcharts, block diagrams, methods, functions, or various embodiments herein.

In some embodiments, for example, the TMU 202 may process the 3D and 2D image data, as scanned or sensed from the 3D-depth camera and photo-realistic camera, for use by other devices (e.g., client device 204 or server 301, as further described herein). For example, the one or more processors and/or one or more memories of the TMU 202 may process the image data scanned or sensed from vehicle storage area 102s. The processing of the image data may generate post-scanning data that may include metadata, simplified data, normalized data, result data, status data, or alert data as determined from the original scanned or sensed image data. In some embodiments, the image data and/or the post-scanning data may be sent to a client application, such as a dashboard application (app) described herein, for viewing, manipulation, or otherwise interaction. In other embodiments, the image data and/or the post-scanning data may be sent to a server (e.g., server 301 as further described herein) for storage or for further manipulation.

As shown in FIG. 2A, the image data and/or the post-scanning data may be received on client device 204. Client device 204 may implement a dashboard app to receive the image data and/or the post-scanning data and display such data, e.g., in graphical or other format, to manager 206 to facilitate the unloading or loading of packages (e.g., 208p1-208p3 or 210), as described herein. In some embodiments, dashboard app may be implemented via a web platform such as Java J2EE (e.g., Java Server Faces) or Ruby on Rails. In such embodiments, the web platform may generate or update a user interface of the dashboard app via generation of a dynamic webpage (e.g., using HTML, CSS, JavaScript) or via a client-facing mobile app (e.g., via Java for a Google Android based app or Objective-C/Swift for an Apple iOS based app), where the user interface is displayed via the dashboard app on the client device, e.g., client device 204.

In some embodiments, the dashboard app may receive the image data and/or the post-scanning data and display such data in real-time. Client device 204 may be a mobile device, such as a tablet, smartphone, laptop, or other such mobile computing device. Client device 204 may implement an operating system or platform for executing the dashboard (or other) apps or functionality, including, for example, any of the Apple iOS platform, the Google Android platform, and/or the Microsoft Windows platform. Client device 204 may include one or more processors and/or one or more memories implementing the dashboard app or for providing other similar functionality. Client device 204 may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

In some embodiments, the image data and/or the post-scanning data may be sent to a server or server, such as server 301 described herein. In such embodiments, the server or server may generate post-scanning data, that may include metadata, simplified data, normalized data, result data, status data, or alert data as determined from the original scanned or sensed image data provided by the TMU 202. As described herein, the server or centralized may store such data, and may also send the image data and/or the post-scanning data to a dashboard app, or other app, implemented on client device, such as the dashboard app implemented on client device 204 of FIG. 2A.

Figure 2B:
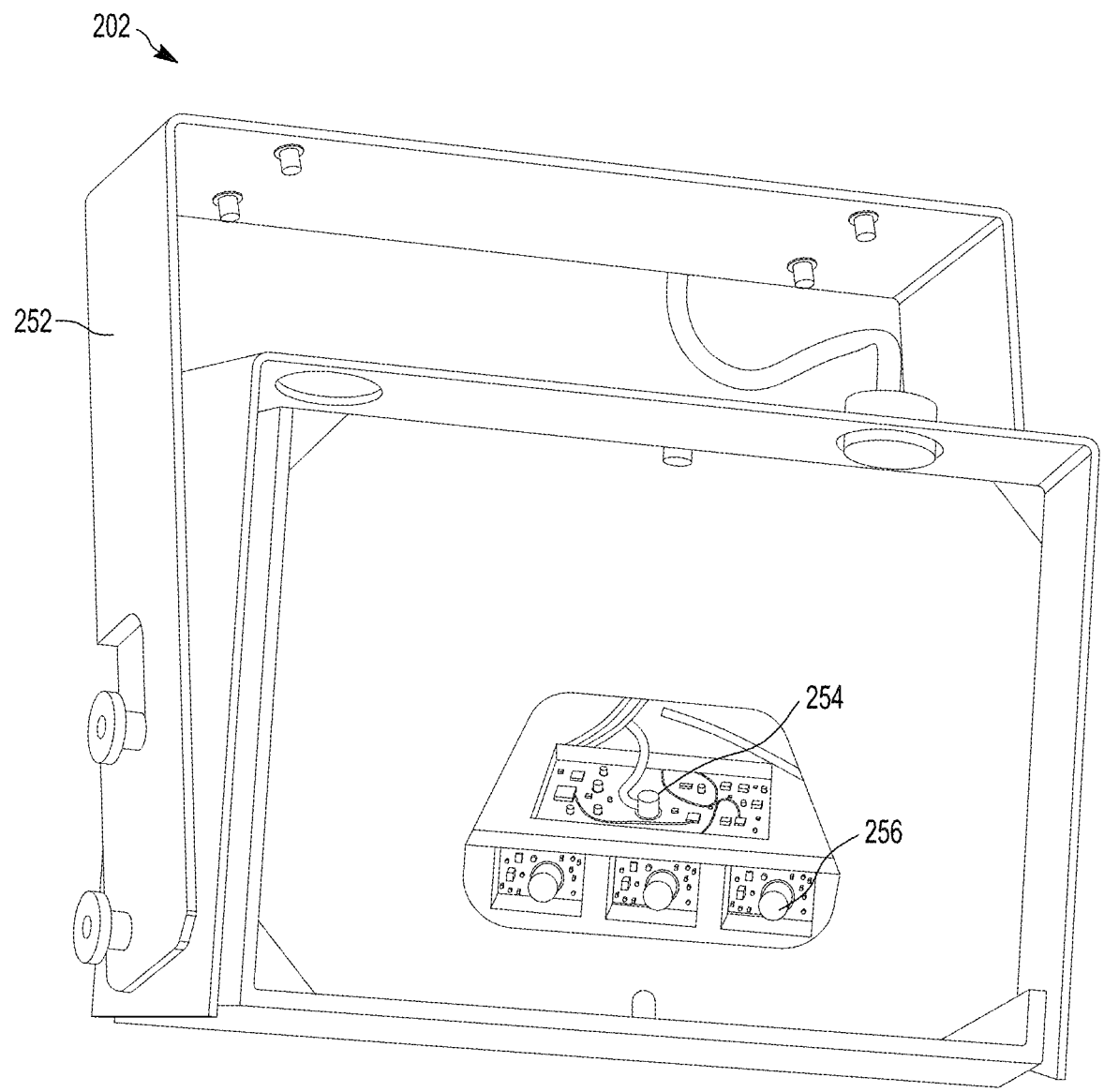
FIG. 2B is a perspective view of a trailer monitoring unit (TMU) of FIG. 2A, in accordance with example embodiments herein.

FIG. 2B is a perspective view of the TMU 202 of FIG. 2A, in accordance with example embodiments herein. In the example embodiment of FIG. 2B, TMU 202 may include a mounting bracket 252 for orienting or otherwise positioning the TMU 202 within loading facility 101 as described herein. The TMU 202 may further include one or more processors and one or more memories for processing image data as described herein. For example, the TMU 202 may include flash memory used for determining, storing, or otherwise processing the imaging data and/or post-scanning data. In addition, TMU 202 may further include a network interface to enable communication with other devices (such as server 301 of FIG. 3 as described herein). The network interface of TMU 202 may include any suitable type of communication interface(s) (e.g., wired and/or wireless interfaces) configured to operate in accordance with any suitable protocol(s), e.g., Ethernet for wired communications and/or IEEE 802.11 for wireless communications.

TMU 202 may include a 3D-depth camera 254 for capturing, sensing, or scanning 3D image data. For example, in some embodiments, the 3D-depth camera 254 may include an Infra-Red (IR) projector and a related IR camera. In such embodiments, the IR projector projects a pattern of IR light or beams onto an object or surface, which, in various embodiments herein, may include surfaces of a vehicle storage area (e.g., vehicle storage area 102s) or objects within the vehicle storage area, such as boxes or packages (e.g., packages 208p1-208p3 or 210). The IR light or beams may be distributed on the object or surface in a pattern of dots or points by the IR projector, which may be sensed or scanned by the IR camera. A depth-detection app, such as a depth-detection app executing on the one or more processors or memories of TMU 202, can determine, based on the pattern of dots or points, various depth values, for example, depth values of vehicle storage area 102s. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or TMU 202 to generate a depth map. The depth map may represent a 3D image of, or contain 3D image data of, the objects or surfaces that were sensed or scanned by the 3D-depth camera 254, for example, the vehicle storage area 102s and any objects or surfaces therein.

The TMU 202 may further include a photo-realistic camera 256 for capturing, sensing, or scanning 2D image data. The photo-realistic camera 256 may be an RGB (red, green, blue) based camera for capturing 2D images having RGB-based pixel data. In some embodiments, the photo-realistic camera 256 may capture 2D images, and related 2D image data, at the same or similar point in time as the 3D-depth camera 254 such that the TMU 202 can have both sets of 3D image data and 2D image data available for a particular surface, object, or scene at the same or similar instance in time.

Figure 3:
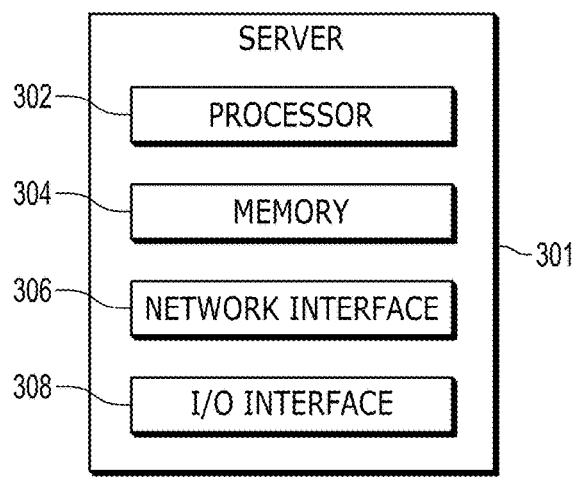
FIG. 3 is a block diagram representative of an embodiment of a server associated with the loading facility of FIG. 2A and the TMU of FIG. 2B.

FIG. 3 is a block diagram representative of an embodiment of a server associated with the loading facility 101 of FIG. 2A. In some embodiments, server 301 may be located in the same facility as loading facility 101. In other embodiments, server 301 may be located at a remote location, such as on a cloud-platform or other remote location. In either embodiment, server 301 may be communicatively coupled to a 3D-depth camera (e.g., TMU 202).

Server 301 is configured to execute computer instructions to perform operations associated with the systems and methods as described herein, for example, implement the example operations represented by the block diagrams or flowcharts of the drawings accompanying this description. The server 301 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. Other technologies or platforms, such as Ruby on Rails, Microsoft .NET, or similar may also be used. As described below, the server 301 may be specifically configured for performing operations represented by the block diagrams or flowcharts of the drawings described herein.

The example server 301 of FIG. 3 includes a processor 302, such as, for example, one or more microprocessors, controllers, and/or any suitable type of processor. The example server 301 of FIG. 3 further includes memory (e.g., volatile memory or non-volatile memory) 304 accessible by the processor 302, for example, via a memory controller (not shown). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the server 301 to provide access to the machine-readable instructions stored thereon.

The example server 301 of FIG. 3 may further include a network interface 306 to enable communication with other machines via, for example, one or more computer networks, such as a local area network (LAN) or a wide area network (WAN), e.g., the Internet. The example network interface 306 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example server 301 of FIG. 3 includes input/output (I/O) interfaces 308 to enable receipt of user input and communication of output data to the user, which may include, for example, any number of keyboards, mice, USB drives, optical drives, screens, touchscreens, etc.

Figure 4A:
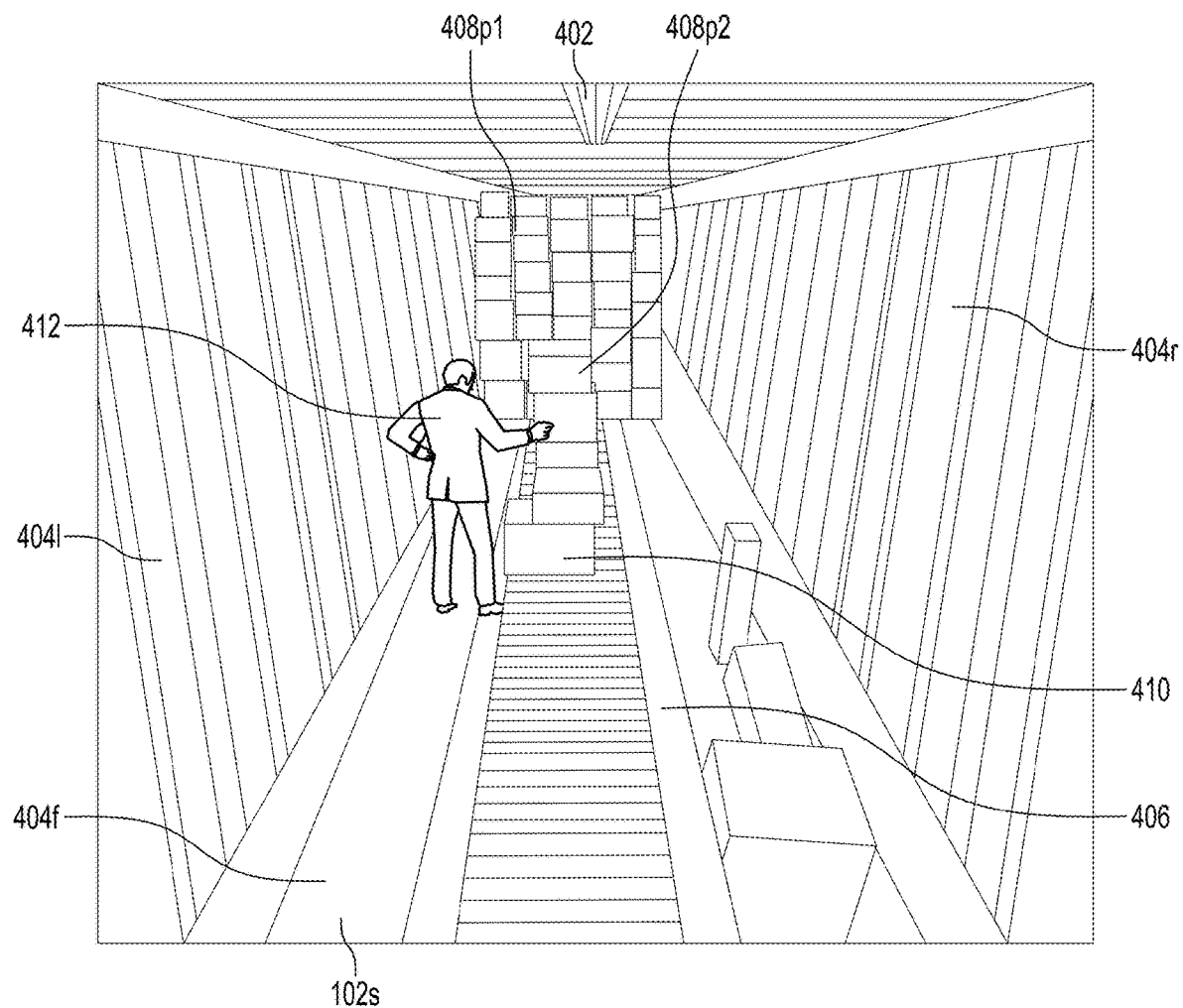
FIG. 4A is a photo-realistic view depicting a first embodiment of the vehicle storage area docked at the docking bay of FIG. 2A where the storage area includes an in-range package wall.

FIG. 4A is a photo-realistic view 402 depicting a first embodiment of the vehicle storage area 102s docked at the docking bay 102d of FIG. 2A where the storage area includes an in-range package wall (e.g., package wall 408p1 or package wall 408p2 as described herein). Photo-realistic view 402 may be a 2D image as captured, for example, by photo-realistic camera 256 of TMU 202. Photo-realistic view 402 may include 2D image data, such as pixel data or RGB data as described herein.

Photo-realistic view 402 depicts package walls 408p1 and 408p2. As used herein, a package wall may be a stack of packages, boxes, or other transportable objects or goods typically involved in distribution and logistics. A package wall may also be a single package that forms the foundation of a new package wall. Each of the packages, boxes, or other transportable objects or goods that make up a particular package wall may share a common depth, dimension, or length such that the particular package wall, as a whole, contains at least one uniform or approximately uniform depth, dimension, or length. As depicted in photo-realistic view 402, package walls 408p1 and 408p2 are located at the rear section of the vehicle storage area 102s, and are in-range of the 3D-depth camera (e.g., 3D-depth camera 254) as described herein. For example, the 3D-depth camera (e.g., 3D-depth camera 254) may have a maximum depth capacity range (e.g., 27.5 feet), where the package walls 408p1 and 408p2 are within or at 27.5 feet from the 3D-depth camera. In some embodiments, package walls 408p1 and 408p2 may correspond to any of the packages or package walls 208p1-208p3 of FIG. 2A as described herein.

As further depicted in photo-realistic view 402, vehicle storage area 102s is defined by surface areas including left wall 404l, right wall 404r, and floor area 404f. The surface areas, including left wall 404l, right wall 404r, and floor area 404f, are generally rigid, or semi-rigid, surface areas that together form the interior space of vehicle storage area 102s.

Photo-realistic view 402 further depicts loading conveyer 406. Loading conveyer 406 may be used to load or unload packages from vehicle storage area 102s to loading facility 101 through docking bay 102s, and vice versa. For example, packages 410 may be loaded or unloaded from vehicle storage area 102s to loading facility 101 through docking bay 102d. Photo-realistic view 402 also depicts worker 412 who may facilitate the loading or unloading of the packages 410, including packages of either of the package walls 408p1 and 408p2. In some embodiments, worker 412 may correspond to worker 212 of FIG. 2A as described herein.

Figure 4B:
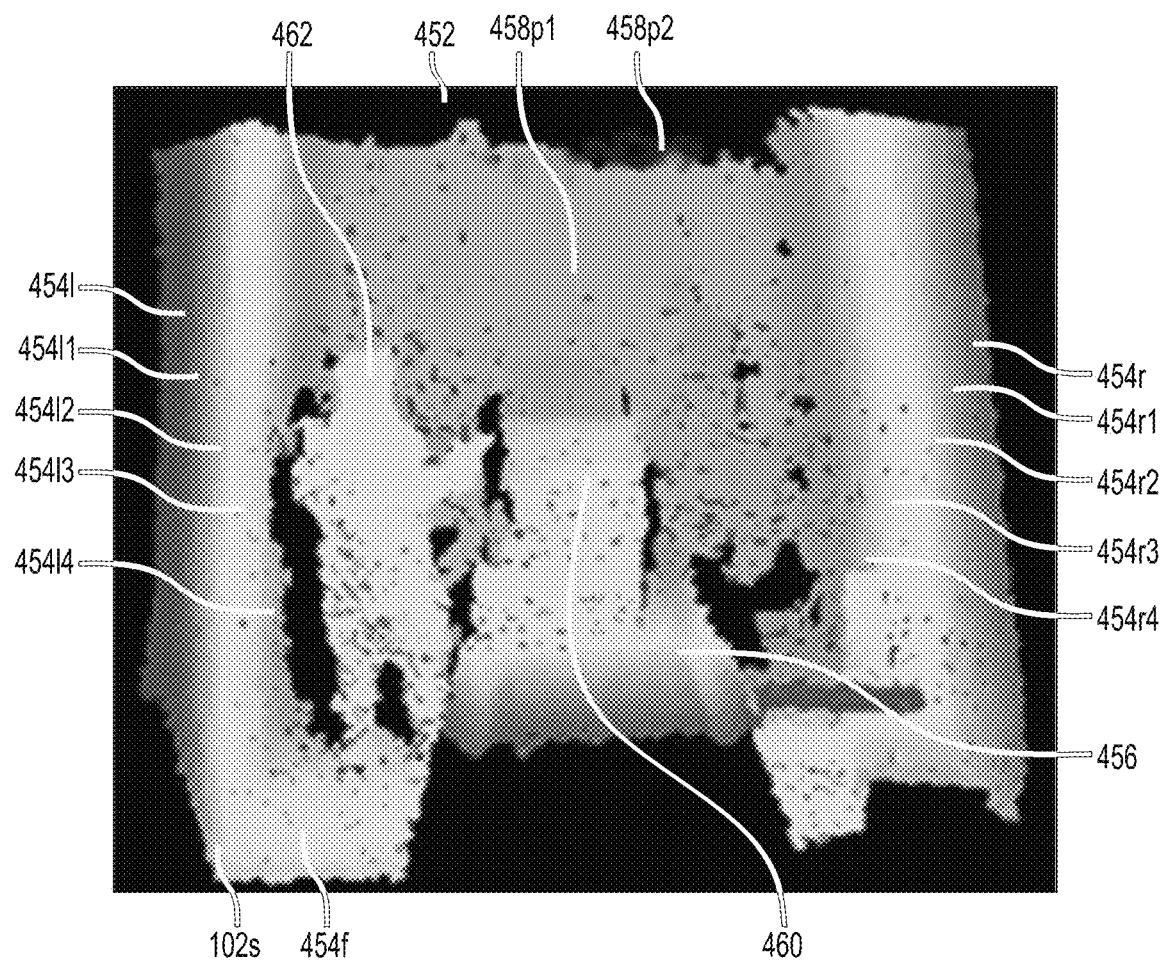
FIG. 4B is a depth-map rendering of the photo-realistic view of FIG. 4A that includes a detected package wall.

FIG. 4B is a depth-map rendering 452 of the photo-realistic view of FIG. 4A that includes a detected package wall. Depth-map rendering 452 represents a 3D image, and 3D image data, of the vehicle storage area 102s docked at the docking bay 102d of FIG. 2A where the storage area includes a detected package wall (e.g., package wall 458p1 or 458p2). Depth-map rendering 452 may be a 3D image as captured, for example, by 3D-depth camera 254 of TMU 202. Depth-map rendering 452 may include 3D image data, such as depth values determined from a depth-map as described herein. The 3D image data may be point cloud data, where the point cloud data is associated with various color pixel values based on depths of the data points within depth-map rendering 452 as described herein. For example, point cloud data may include a set of data points that can represent depth, distances, and the 3D shape of surfaces or objects scanned by a 3D-depth camera.

Depth-map rendering 452 includes the same or similar surfaces and objects as photo-realistic view 402, except the depth-map rendering 452 represents such surfaces and objects via 3D imagery and/or data. For example, depth-map rendering 452 includes package walls 458p1 and 458p2 that correspond to package walls 408p1 and 408p2 (but are represented in via 3D imagery and/or data). As for package walls 408p1 and 408p2 of photo-realistic view 402, package walls 458p1 and 458p2 of depth-map rendering 452 are also located at the rear section of the vehicle storage area 102s. Similarly, vehicle storage area 102s is defined by surface areas including left wall 454l, right wall 454r, and floor area 454f of depth-map rendering 452, which correspond to left wall 404l, 404r, and floor area 404f of photo-realistic view 402. In addition, as for photo-realistic view 402, depth-map rendering 452 also depicts a loading conveyer 456 that corresponds to loading conveyer 406. Depth-map rendering 452 also depicts worker 462 who corresponds to worker 412 of the photo-realistic view 402.

Depth-map rendering 452 represents various depth values of the 3D image data via different color pixel values. In the embodiment shown in FIG. 4B, an example color rendering scheme may represent depth values via different color pixels (e.g., different RGB pixel values) where the depth-map rendering 452 displays nearer distances (e.g., smaller depth values) in warmer colors, but displays further distances (e.g., larger depth values) in cooler colors. For example, as shown in depth-map rendering 452, the warm colors red, orange, and yellow may represent near depth values, but the cool colors green, cyan, and blue may represent far depth values. In some embodiments, each of the color values (e.g., each of several color pixels defined by RGB values) of depth-map rendering 452 may represent a unique depth value. For example, a pixel having a red-toned color (RGB values: 255, 0, 0) may represent a nearer distance (e.g., 5 feet from the 3D-depth camera), but a blue-toned color (RGB values: 0, 0, 255) may represent a further distance (e.g., 27 feet from the 3D-depth camera). Black or dark regions or areas represent regions that the 3D-depth camera did not read or sense. Such regions are referred to herein as void data regions.

As shown in the embodiment of FIG. 4B, left wall 454*l* of depth-map rendering 452 is shown in a plurality of colors representing the various depths or distances of left wall 454*l* from the 3D-depth camera (e.g., the 3D-depth camera 254) along the distance of the vehicle storage area 102*s*. As shown, the nearest portion 454/1 of left wall 454*l* is shown in red pixels (e.g., red pixels may represent distances of 1 to 5 feet), the second nearest portion 454/2 is shown in orange pixels (e.g., orange pixels may represent distances of 5 to 10 feet), and the next nearest portion 454/3 is shown yellow pixels (e.g., yellow pixels may represent distances of 10 to 15 feet). Wall portion 454/4 is represented in green pixels which represents a further wall portion (e.g., green pixels may represent distances of 15 to 20 feet). Still further, cyan pixels may represent distances of 20-25 feet. For example, as shown in depth-map rendering 452, package wall 458*p*1 is depicted in cyan pixels because it was detected between 20-25 feet from the 3D-depth camera (e.g., the 3D-depth camera 254). In addition, blue pixels may represent distances of 25-27.5 feet. For example, package wall 458*p*2 is depicted in blue pixels because it was detected between 25-27.5 feet from the 3D-depth camera (e.g., the 3D-depth camera 254).

As for left wall 454*l*, right wall 454*r* is rendered with the same or similar colors down the length of right wall 454*r*, including each of the right wall portions 454*r*1 (*red*), 454*r*2 (*orange*), 454*r*3 (*yellow*), and 454*r*4 (*green*), thereby representing the same or similar depths or distances as described for left wall portions 454/1 (*red*), 454/2 (*orange*), 454/3 (*yellow*), and 454/4 (*green*) of left wall 454*l*.

In will be understood that although described in the various embodiments herein, 3D-depth camera (e.g., the 3D-depth camera 254) is cable of detecting more precise distances than 2.5 or 5 foot increments. For example, 3D-depth camera may detect distances or depths of objects or surfaces as spaced inches or fractions of inches from one another. In addition, as described above, each pixel may represent a unique distance via RGB values such that any permutation of the RGB value spectrum, which includes RGB values (R: 0 to 255, G: 0 to 255, B: 0 to 255), may represent a unique depth value in the depth-map rendering 452, which, in the given embodiment of depth-map rendering 452, can represent over 16 million unique depth values for unique distances or depths for objects or surfaces within vehicle storage area 102*s*.

As further shown in depth-map rendering 452, each of floor area 454*f*, worker 46, and packages 460 are depicted with yellow-based depth values (e.g., near distances) from the 3D-depth camera (e.g., 3D-depth camera 254). Loading conveyer 456 is shown in various color-based depth values (e.g., red, orange, yellow, green) because the length of loading conveyer 456 spans the length of the vehicle storage area 102*s* similar to as shown and described for walls 454*l* and 454*r*.

Figure 5A:
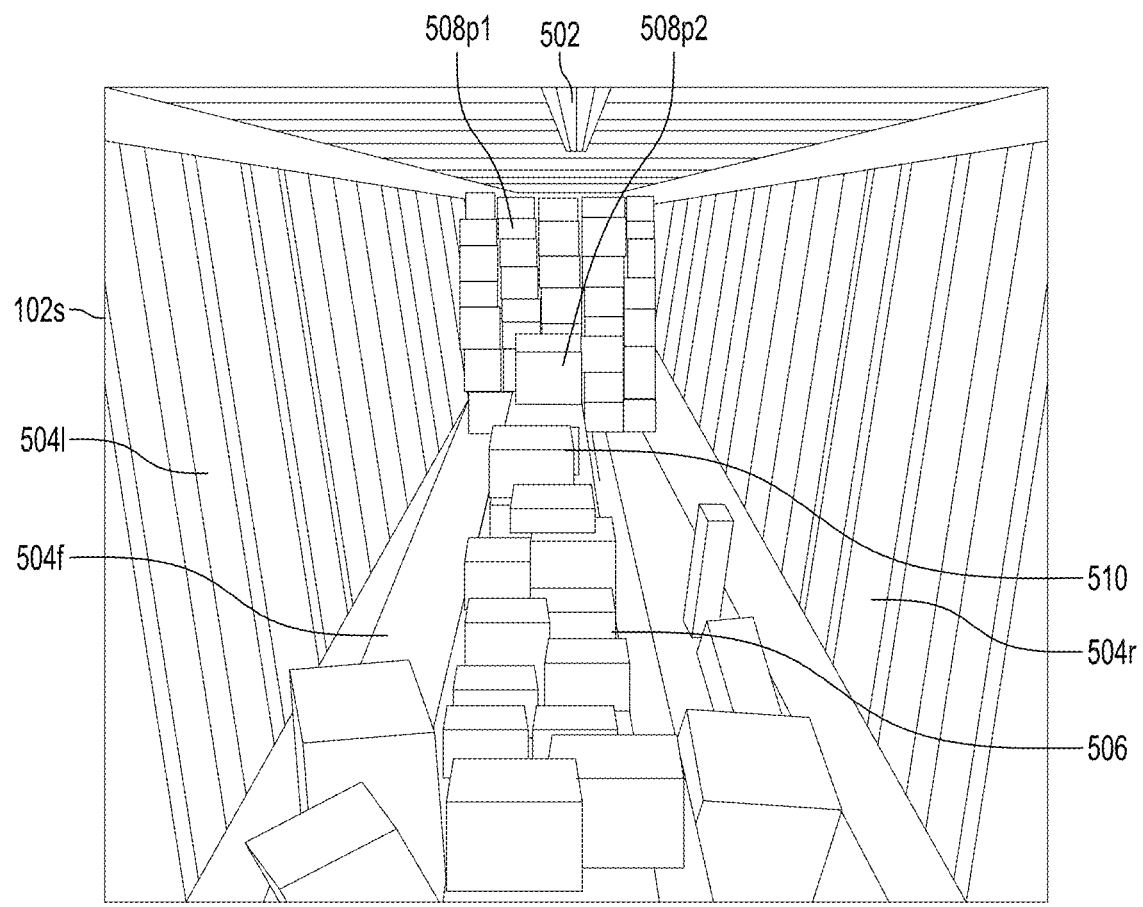
FIG. 5A is a photo-realistic view depicting a second embodiment of the vehicle storage area docked at the docking bay of FIG. 2A where the storage area includes an out-of-range package wall.

FIG. 5A is a photo-realistic view 502 depicting a second embodiment of the vehicle storage area 102*s* docked at the docking bay 102*d* of FIG. 2A where the storage area includes an out-of-range package wall (e.g., package wall 508*p*1 and package wall 508*p*2 as described herein). Photo-realistic view 502 may be a 2D image as captured, for example, by photo-realistic camera 256 of TMU 202. Photo-realistic view 502 may include 2D image data, such as pixel data or RGB data as described herein.

Photo-realistic view 502 depicts package walls 508*p*1 and 508*p*2. As depicted in photo-realistic view 502, package walls 508*p*1 and 508*p*2 are located at the rear section of the vehicle storage area 102*s*, but are out-of-range of the 3D-depth camera (e.g., 3D-depth camera 254) as described herein. For example, the 3D-depth camera (e.g., 3D-depth camera 254) may have a maximum depth capacity range (e.g., 27.5 feet), where the package walls 508*p*1 and 508*p*2 are beyond 27.5 feet from the 3D-depth camera. For example, package walls 508*p*1 and 508*p*2 may be located at or near the rear wall of a 53 foot trailer (e.g., vehicle storage area) and, therefore, be beyond the 3D-depth camera's maximum depth capacity. In some embodiments, package walls 508*p*1 and 508*p*2 may correspond to any of the packages or package walls 208*p*1-208*p*3 of FIG. 2A as described herein.

As further depicted in photo-realistic view 502, and as described for photo-realistic view 402, vehicle storage area 102*s* is defined by surface areas including left wall 504*l*, right wall 504*r*, and floor area 504*f*. The surface areas, including left wall 504*l*, right wall 504*r*, and floor area 504*f*, are generally rigid, or semi-rigid, surface areas that together form the interior space of vehicle storage area 102*s*.

In addition, and as described for photo-realistic view 402, photo-realistic view 502 further depicts loading conveyer 506, which performs the same functionality as described with respect to photo-realistic view 402 herein.

Figure 5B:
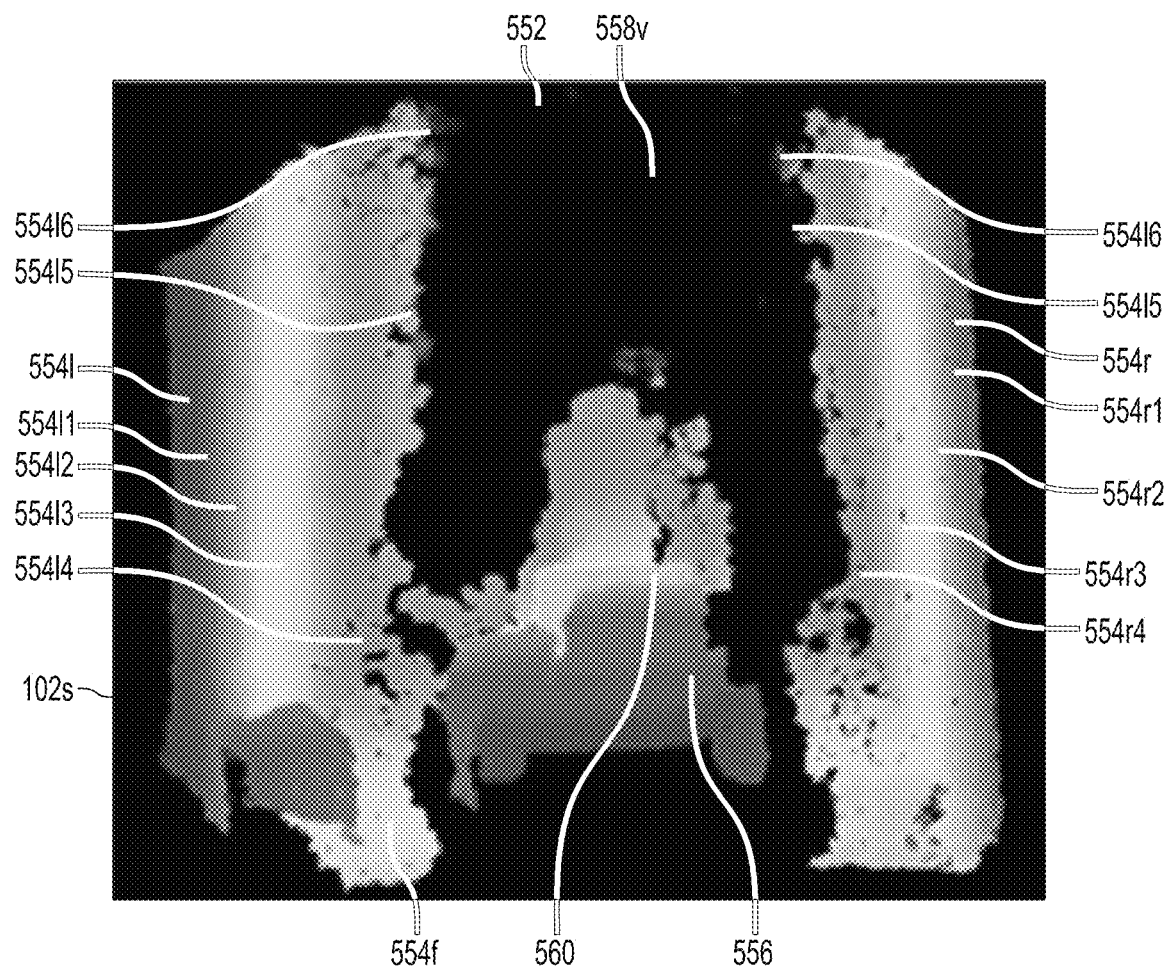
FIG. 5B is a depth-map rendering of the photo-realistic view of FIG. 5A that does not include a detected package wall.

FIG. 5B is a depth-map rendering 552 of the photo-realistic view of FIG. 5A that does not include a detected package wall. For example, depth-map rendering 552 represents a 3D image, and 3D image data, of the vehicle storage area 102*s* docked at the docking bay 102*d* of FIG. 2A where the storage area does not include a detected package wall (e.g., where instead there are void data region(s) as described herein). Depth-map rendering 552 may be a 3D image as captured, for example, by 3D-depth camera 254 of TMU 202. Depth-map rendering 552 may include 3D image data, such as depth values determined from a depth-map as described herein.

Depth-map rendering 552 includes the same or similar surfaces and objects as photo-realistic view 502, except the depth-map rendering 552 represents such surfaces and objects via 3D imagery and/or data. For example, as for depth-map rendering 452, vehicle storage area 102*s* is defined by surface areas including left wall 554*l*, right wall 554*r*, and floor area 554*f* of depth-map rendering 552, which correspond to left wall 504*l*, 504*r*, and floor area 504*f* of photo-realistic view 502. In addition, as for photo-realistic view 502, depth-map rendering 552 also depicts a loading conveyer 556 that corresponds to loading conveyer 506.

As for depth-map rendering 452, depth-map rendering 552 represents various depth values of the 3D image data via different color pixel values. Accordingly, in the embodiment shown in FIG. 5B, an example color rendering scheme may represent depth values via different color pixels (e.g., different RGB pixel values) where the depth-map rendering 552 displays nearer distances (e.g., smaller depth values) in warmer colors, but displays further distances (e.g., larger depth values) in cooler colors. For example, as described for depth-map rendering 452, and as shown in depth-map rendering 552, the warm colors red, orange, and yellow may represent near depth values, but the cool colors green, cyan, and blue may represent far depth values. For example, left wall 554*l* of depth-map rendering 552 is shown in a plurality of colors representing the various depths or distances of left wall 554*l* from the 3D-depth camera (e.g., the 3D-depth camera 254) along the length of the vehicle storage area 102*s*. As shown, the nearest portion 554*l*1 of left wall 554*l* is shown in red pixels (e.g., red pixels may represent distances of 1 to 5 feet), the second nearest portion 554*l*2 is shown in orange pixels (e.g., orange pixels may represent distances of 5 to 10 feet), and the next nearest portion 554*l*3 is shown yellow pixels (e.g., yellow pixels may represent distances of 10 to 15 feet). Wall portion 554*l*4 is represented in green pixels which represents a further wall portion (e.g., green pixels may represent distances of 15 to 20 feet). Still further, cyan pixels may represent distances of 20-25 feet. For example, as shown in depth-map rendering 552, wall portion 554*l*5 is depicted in cyan pixels because it was detected between 20-25 feet from the 3D-depth camera (e.g., the 3D-depth camera 254). In addition, blue pixels may represent distances of 25-27.5 feet. For example, wall portion 554*l*6 is depicted in blue pixels because it was detected between 25-27.5 feet from the 3D-depth camera (e.g., the 3D-depth camera 254). As for left wall 554*l*, right wall 554*r* is rendered with the same or similar colors down the length of right wall 554*r*, including each of the right wall portions 554*r*1 (red), 554*r*2 (orange), 554*r*3 (yellow), 554*r*4 (green), 554*r*5 (cyan), and 554*r*6 (blue), thereby representing the same or similar depths or distances as described for left wall portions 554*l*1 (red), 554*l*2 (orange), 554*l*3 (yellow), 554*l*4 (green), 554*l*5 (cyan), and 554*l*6 (blue) of left wall 554*l*. As described for depth-map rendering 452, it will be understood that although described in the various embodiments herein, 3D-depth camera (e.g., the 3D-depth camera 254) is cable of detecting more precise distances than 2.5 or 5 foot increments.

As further shown in depth-map rendering 552, each of floor area 554*f* and packages 560 are detected a yellow-based depth values (e.g., near distances) from the 3D-depth camera (e.g., 3D-depth camera 254). Loading conveyer 556 is shown in various color-based depth values (e.g., red, orange, yellow, green) because the length of loading conveyer 556 spans the length of the vehicle storage area 102*s* similar to as shown and described for walls 554*l* and 554*r*, and for depth-map rendering 452.

As described herein, black or dark regions represent regions that the 3D-depth camera did not read, scan, or sense detect, e.g., because the area or region was out-of-range, missed by the 3D-depth camera sensors, or was otherwise unavailable. Such regions are therefore referred to as void data regions. For example, in the embodiment of FIG. 5B, depth-map rendering 552 does not include a detected package wall (e.g., such as package walls 508*p*1 and 508*p*2). This is because package walls 508*p*1 and 508*p*2, as shown in photo-realistic view 502, are out-of-range with respect to the 3D-depth camera (e.g., 3D-depth camera 254 of TMU 202) such that the 3D-depth camera was unable to sense or detect package walls 508*p*1 and 508*p*2. Thus, depth-map rendering 552 includes void data region 558*v* that represents an area that 3D-depth camera was unable to sense or detect 3D image data for that region of vehicle storage area 102*s*.

Figure 6A:
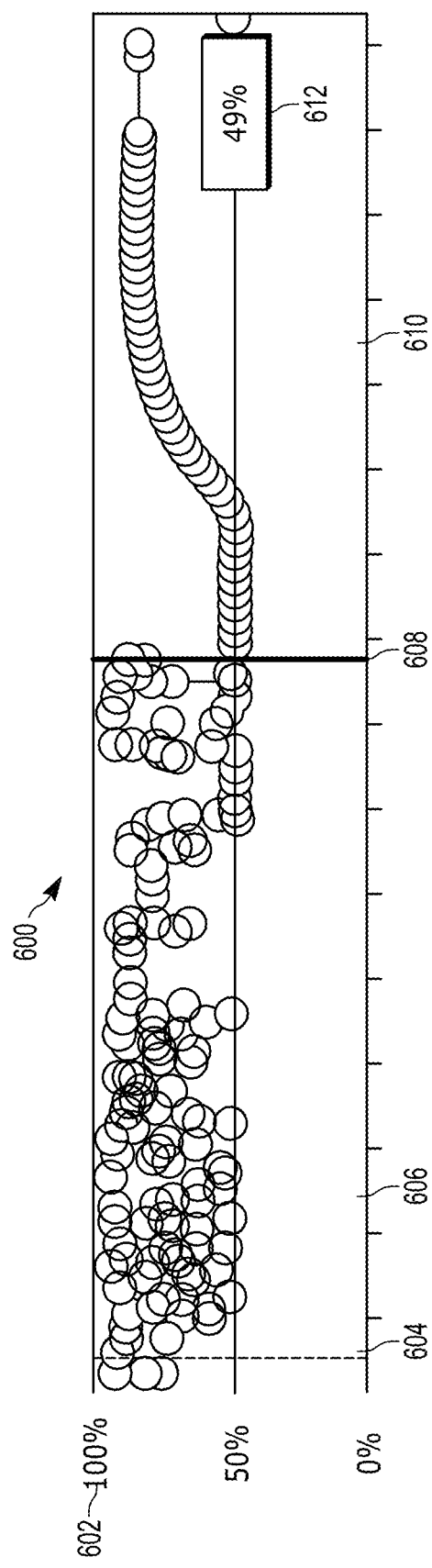
FIG. 6A illustrates a first embodiment of a storage area capacity graph that includes inaccurate vehicle storage area capacity values.

FIG. 6A illustrates a first embodiment of a storage area capacity graph 600 that includes inaccurate vehicle storage area capacity values. Storage area capacity graph 600 may be implemented via a dashboard app on a client device, such as client device 204, as described herein. Storage area capacity graph 600 depicts a scatter plot of reported vehicle storage area fullness. As indicated by vehicle storage area capacity value scale 602 (y-axis), the storage area capacity graph 600 may represent a percentage (0% to 100%) of the fullness of a vehicle storage area, e.g., how full vehicle storage area 102*s* is with respect to packages, boxes, or other transportable goods or objects presently loaded within vehicle storage area 102*s*. Time scale 604 (x-axis) represents the time(s) at which various individual vehicle storage area capacity values are determined. Storage area capacity graph 600 is divided into two logical sections, section 606 and section 610 by maximum depth capacity indicator 608. Sections 606, 610, and maximum depth capacity indicator 608 may or may not be displayed on storage area capacity graph 600, e.g., via the dashboard app. In any event, maximum depth capacity indicator 608 indicates a point at which a rear wall, such as a package wall (e.g., package walls made of packages 208*p*1-208*p*3) or a rear wall of a vehicle storage area (e.g., of vehicle storage area 102*s*) is sensed or detected by 3D-depth camera (e.g., 3D-depth camera 254 of TMU 202). That is, maximum depth capacity indicator 608 indicates when a package wall came into range of the 3D-depth camera. As described herein, the 3D-depth camera may have a maximum depth capacity (e.g., 27.5 feet), and, thus may provide no (or inaccurate) readings for objects or surfaces beyond that distance. For example, as shown in FIG. 6A, determinations of vehicle storage area capacity values in section 606 of storage area capacity graph 600 are inaccurate because the objects or surfaces sensed or detected up to that point are not associated with true package walls. Such objects or surfaces may be other objects or surfaces moving, or otherwise changing position, within vehicle storage area that cause the vehicle storage area capacity values of section 606 to fluctuate inaccurately (as shown in FIG. 6A).

For example, in one embodiment, 3D-depth camera 254 of TMU 202 may have a limited range of only 27.5 feet. In the present embodiment, vehicle storage area 102*s* may reach up to 53 feet in length, thus making the rear wall (e.g., a package wall) of vehicle storage area 102*s* out-of range with respect to the 3D-depth camera 254. This would result in a loss of image data captured by 3D-depth camera 254 until the package wall (e.g., as stacked by a worker, e.g., worker 212) reaches the 27.5 foot point of the vehicle storage area 102*s*. In such instances, the resulting 3D image data captured by 3D-depth camera 254 may be represented as depth-map rendering 552, where the rear wall would be represented as a void data region (e.g., void data region 558*v*). In the present embodiment, because no package wall is detected, individuals (e.g., worker 212), and packages being loaded into the vehicle storage area 102*s* would be the current largest objects sensed by the 3D-depth camera 254. This may cause the 3D-depth camera 254 to falsely identify such individuals or packages as a package wall(s). Because such individuals, and packages being loaded (e.g., via loading conveyer 406 or 506), are constantly moving within vehicle storage area 102*s*, the calculated distance to such moving objects also keeps changing. This causes the reported vehicle storage area capacity values of section 606 to rapidly fluctuate in the user facing dashboard app, as depicted in section 606 of storage area capacity graph 600.

When a true package wall comes in-range of the 3D-depth camera 254 (e.g., package wall 408*p*1 or 408*p*2), then an accurate series of storage area capacity values may be read from the related 3D-depth map rendering (e.g., as shown in depth-map rendering 452 as described herein). For example, as shown in storage area capacity graph 600, section 610 depicts a steady plot of storage area capacity values which represents values determined after a true package wall came in-range of the 3D-depth camera 254 such that the storage area capacity graph 600 accurately shows storage area capacity values in section 610, and, over time, after the maximum depth capacity indicator 608. For example, in the embodiment of FIG. 6A, section 610 of storage area capacity graph 600 shows that the vehicle storage area 102s is steadily filling up (e.g., more packages are being loaded to create closer package walls) over time, and is currently at a present fullness value 612 of 49% of total capacity.

Figure 6B:
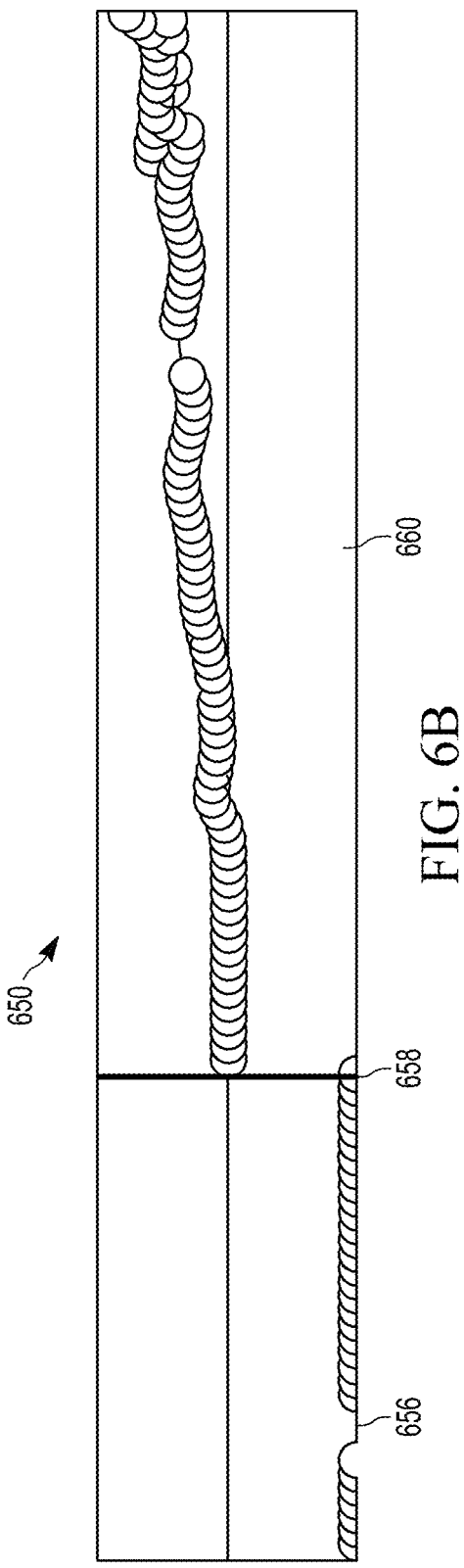
FIG. 6B illustrates a second embodiment of a storage area capacity graph that includes zero-based or default vehicle storage area capacity values.

FIG. 6B illustrates a second embodiment of a storage area capacity graph 650 that includes zero-based or default vehicle storage area capacity values. As for storage area capacity graph 600, storage area capacity graph 650 may be implemented via a dashboard app on a client device, such as client device 204, as described herein. Storage area capacity graph 650 also depicts a scatter plot of reported vehicle storage area fullness, where the storage area capacity graph 650 may represent a percentage (0% to 100%) of the fullness of a vehicle storage area over time. As for storage area capacity graph 600, storage area capacity graph 650 is divided into two logical sections, section 656 and section 660 by maximum depth capacity indicator 658. Sections 656, 660, and maximum depth capacity indicator 658 may or may not be displayed on storage area capacity graph 650, e.g., via the dashboard app. In any event, similar to maximum depth capacity indicator 608, maximum depth capacity indicator 658 indicates a point at which a rear wall, such as a package wall (e.g., package walls made of packages 208p1-208p3) or a rear wall of a vehicle storage area (e.g., of vehicle storage area 102s) is sensed or detected by 3D-depth camera (e.g., 3D-depth camera 254 of TMU 202). Storage area capacity values plotted in section 656 represent values beyond the range (i.e., that are out-of-range) of the 3D-depth camera, and storage area capacity values plotted in section 660 represent values within the range (i.e., that are in-range) of the 3D-depth camera.

Unlike storage area capacity graph 600, storage area capacity graph 650 depends on a depth-detection app for the vehicle storage area capacity values of section 656. The depth-detection app generates an out-of-range indicator that causes the dashboard app to set the storage area capacity values to zero or default values in section 656 indicating that a wall (e.g., package wall 508p1 and 508p2) is out-of-range with respect to the 3D-depth camera. Accordingly, the depth-detection app eliminates the presentation of inaccurate or false positive vehicle storage area capacity values. It also allows the dashboard app, via the storage area capacity graph 650, to visually represent to a user, such as manager 206, that the 3D-depth camera is out of range with respect to a package wall (e.g., package wall 508p1 and 508p2). As shown in storage area capacity graph 650, only after a package wall is accurately detected by the 3D-depth camera (e.g., package wall 458p1 and 458p2), does the storage area capacity graph 650 plot storage area capacity values, as shown in section 660.

In various embodiments, depth-detection app determines whether a package wall is in or out of range by analyzing 3D image data to determine whether particular void data regions are present. For example, depth-detection app may analyze the 3D image data of depth-map rendering 552. The depth-detection app may identify void data region 558v by analyzing the point cloud data of depth-map rendering 552. Identification of a void data region may indicate to the depth-detection app that a package wall is not yet detected by the 3D-depth camera. By contrast, identification of non-void data region (e.g., at the rear of the vehicle storage area 102s) may indicate that a package wall is detected (e.g., such as package walls 458p1 or 458p2).

To determine whether a package wall is not detected, in specific embodiments, the depth-detection app may look for void data regions in particular locations. For example, depth-map rendering 552 includes void data region 558v at the top region of the vehicle storage area 102s. By analyzing the top region of the image data of vehicle storage area 102s, the depth-detection app may experience greater efficiency in determining that a package wall is not detected at the rear of the vehicle storage area 102s because, e.g., the image data at the bottom area may contain moving objects (e.g., individuals or packages involved with loading or unloading the vehicle storage area).

In some embodiments, depth-detection app may also analyze 3D image data to detect a floor data region(s) of a vehicle storage area. Detecting a floor data region may improve the accuracy of the depth-detection app, because objects or surfaces (such as moving individuals or packages within a vehicle storage area) may come too close to the 3D-depth camera causing the 3D-depth camera to mimic the behavior of a package wall that is out of range of the 3D-depth camera as described herein. In order to accommodate such false positive scenarios, the depth-detection app analyzes the 3D image data to determine whether a floor data region of the vehicle storage area is detected. This is because, in the event that an object or surface was temporarily blocking the 3D-depth camera (e.g., came too close the 3D-depth camera), and the 3D image reported the 3D-depth camera would have no 3D image data related to a floor data region. Thus, the depth-detection app would determine, based on the lack of a floor data region, that the 3D-depth camera was partially or fully blocked. For example, the depth-detection app may analyze the 3D image data of either of depth-map rendering 452 or depth-map rendering 552 to detect floor area 454f or 554f, respectively, to determine that an object or surface was not blocking the 3D-depth camera (e.g., 3D-depth camera 254 of TMU 202).

In some embodiments, the depth-detection app may analyze the 3D image data to determine whether both a void data region and a floor data region are present in order to indicate that a package wall was in range. For example, the 3D image data represented by depth-map rendering 552 may be analyzed by the depth-detection app such that depth-detection app detects both void data region 558v and floor data region 554f. In such instances, the depth-detection app may generate an out-of-range indicator indicating that a wall (e.g., package wall 508p1 or 508p2) situated at a rear section of the vehicle storage area 102s is not detected. Thus, if the 3D-depth camera detects both a floor data region and a void data region, the depth-detection app can determine that there is a package wall out of range, and that any other data points it senses are extraneous boxes or loaders. By determining that a package wall is out-of-range, the depth-detection app can send result data to a server (e.g., server 301) that can be used by the dashboard app to display default or zero values on a storage area capacity graph as described herein. This can be useful to a user (e.g., manager 206) where the storage area capacity graph can be flat-lined to correct for the inaccurate values that would be reported without the use of the depth-detection app.

By contrast, in another example, the 3D image data represented by depth-map rendering 452 may be analyzed by the depth-detection app such that depth-detection app detects a package wall (e.g., package wall 408p1 or 408p2). In such instances, the depth-detection app may generate an in-range indicator indicating that a wall (e.g., package wall 408p1 or 408p2) situated at a rear section of the vehicle storage area 102s is detected.

Figure 7:
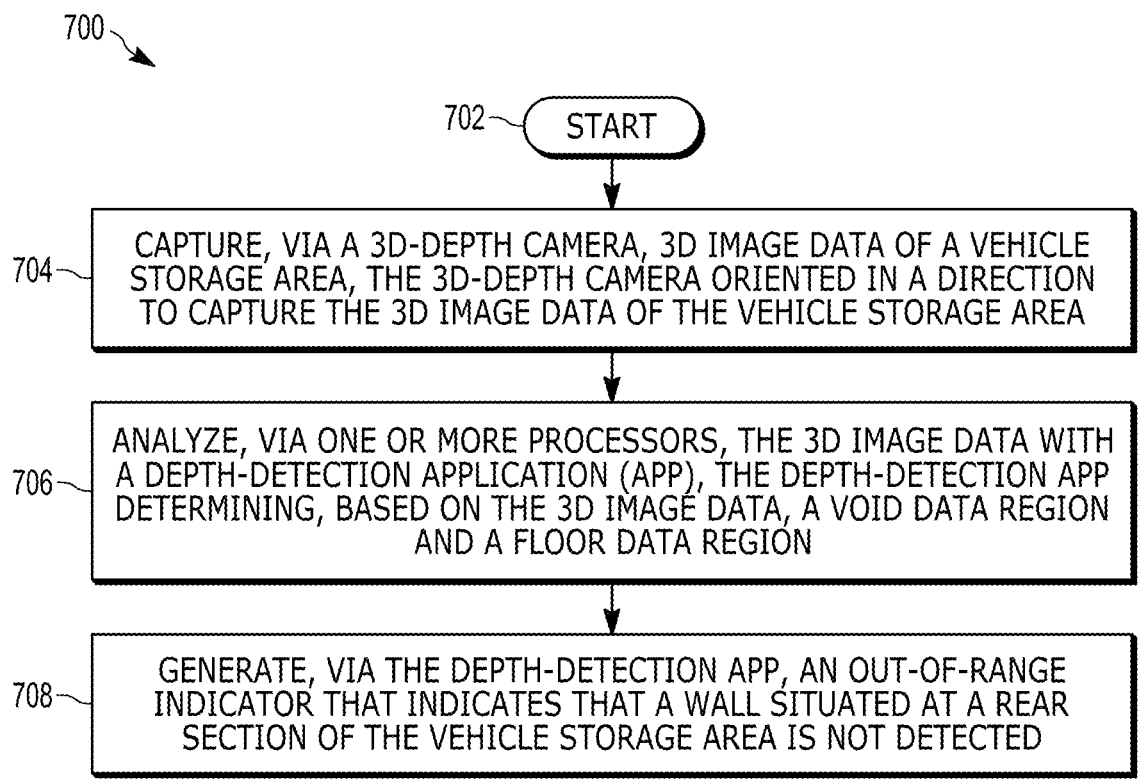
FIG. 7 is a flow chart of a depth imaging method for use in commercial trailer loading.

FIG. 7 is a flow chart of a depth imaging method 700 for use in commercial trailer loading. Method 700 begins (702) at block 704, where a 3D-depth camera (e.g., such as 3D-depth camera 254 of TMU 202) captures 3D image data of a vehicle storage area (e.g., such as vehicle storage area 102s). The 3D-depth camera is oriented in a direction to capture the 3D image data of the vehicle storage area as described herein. In various embodiments, the 3D image data may be 3D point cloud data. Such point cloud data may be represented in a variety of formats, including the Polygon File Format (ply) or the Point Cloud Library Format (pcd). In additional embodiments, the 3D image data may be captured periodically, for example, such as every 30 seconds, every minute, or every two minutes, etc., but may be captured at any time frequency provided by the related 3D-depth camera, e.g., such as provided by TMU 202.

At block 706, the 3D image data captured by the 3D-depth camera is analyzed by a depth-detection app executing on one or more processors. In some embodiments, the one or more processors may be processors(s) of the TMU 202, as described herein. In certain embodiments the 3D-depth camera and the one or more processors may be housed in a mountable device, such as TMU 202 depicted in FIGS. 2A and 2B. In other embodiments, the one or more processors may be processors(s) (e.g., processor 302) of the server 301 as described herein. Based on the 3D image data, the depth-detection app determines a void data region. Void data regions may be determined, for example, by analyzing the 3D image data (e.g., 3D point cloud data) and identifying areas, regions, or cavities within the 3D space of 3D image that lack, or are missing, data points. In some embodiments, the void data region may be associated with a top area of the vehicle storage area, such as void data region 558v represented in depth-map rendering 552 and/or such as top 75% of the center storage area in the trailer.

The depth-detection app further determines, based on the 3D image data, a floor data region. For example, the floor data region may be associated with a floor area of the vehicle storage area, such as floor data region 554f represented in depth-map rendering 552. Floor data regions may be determined, for example, via 3D imaging segmentation analysis. In one embodiment, for example, sample consensus (SAC) segmentation analysis may be used to determine points in the 3D image data (e.g., 3D point cloud data) that correspond to different planes or surfaces of walls, ceilings, or floors, of a vehicle storage area, such as walls 554l/554r and floor 554f of vehicle storage area 102s of depth-map rendering 552 of FIG. 5B. SAC segmentation analysis determines, or segments, the different planes or surfaces of walls, ceiling, and floors into x, y, z coordinate planes by identifying a correlation of common points along x, y, z planes oriented within the 3D image data. For example, referring to depth-map rendering 552, floor 554f includes a correlation of common points along the lower x-axis within the 3D image data of depth-map rendering 552, and, is thereby identified by the depth-detection app as the floor data region 554f.

At block 708, the depth-detection app generates an out-of-range indicator that indicates that that a wall (e.g., a wall of the vehicle storage area or a package wall, such as 508p1 or 508p2) situated at a rear section of the vehicle storage area is not detected. In various embodiments, the out-of-range indicator may be based on the depth-detection app's detection of both the void data region (e.g., void data region 558v) and the floor data region (e.g., floor data region 554f).

In some embodiments, a dashboard app executing on a client device (e.g., such as client device 204 of FIG. 2A), may receive the out-of-range indicator. In certain embodiments the out-of-range indicator may be received by the dashboard app from the TMU device (e.g., the TMU 202). In other embodiments the out-of-range indicator may be received by the dashboard app from a server (e.g., server 301).

In additional embodiments, the dashboard app may include a vehicle storage area capacity value (e.g., such as shown in storage area capacity graphs 600 and 650). As described herein, the vehicle storage area capacity value may indicate a remaining capacity or fullness of a vehicle storage area, such as vehicle storage area 102s. In certain embodiments, receipt of the out-of-range indicator may cause the dashboard app to display an out-of-range message. The out-of-range message may display or indicate that the 3D-depth camera is out of range with respect to a wall (e.g., a wall of the vehicle storage area or a package wall, such as 508p1 or 508p2) situated at the rear section of the vehicle storage area, e.g., vehicle storage area 102s.

In still further embodiments, the dashboard app may include, or render, a vehicle storage area capacity graph. The vehicle storage area capacity graph may graphically indicate one or more vehicle storage area capacity value(s) over one or more time value(s), for example as shown in shown in storage area capacity graphs 600 and 650 herein. In certain embodiments, for example, as described for storage area capacity graph 650, the out-of-range indicator may cause the dashboard app to not display the vehicle storage area capacity value. In related embodiments, as describe herein for storage area capacity graph 650, the out-of-range indicator may cause the dashboard app to display a zero or default value for the vehicle storage area capacity value.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A three-dimensional (3D) depth imaging system for use in commercial trailer loading, the 3D depth imaging system comprising:
    a 3D-depth camera configured to capture 3D image data, the 3D-depth camera oriented in a direction to capture 3D image data of a vehicle storage area; and
    a depth-detection application (app) executing on one or more processors, the depth-detection app determining, based on the 3D image data, a void data region and a floor data region,
    wherein the void data region is a first region within a field of view of the 3D-depth camera that the 3D-depth camera at least one of did not read, scan, or sense detect,
    wherein the floor data region is a second region within the field of view of the 3D-depth camera that corresponds to a floor area of the vehicle storage area, and
    wherein the determination of the void data region and the floor data region cause the depth-detection app to generate an out-of-range indicator, the out-of-range indicator indicating that a wall situated at a rear section of the vehicle storage area is not detected.

2. The 3D depth imaging system of claim 1, wherein the 3D-depth camera and the one or more processors are housed in a mountable device.

3. The 3D depth imaging system of claim 1, wherein the wall may be any one of: a package wall or a wall of the vehicle storage area.

4. The 3D depth imaging system of claim 1, wherein the void data region is associated with a top area of the vehicle storage area.

5. The 3D depth imaging system of claim 1, wherein the floor data region is associated with a floor area of the vehicle storage area.

6. The 3D depth imaging system of claim 1 further comprising a dashboard app, the dashboard app executing on a client device, and wherein the determination of the void data region and the floor data region further causes the dashboard app to receive the out-of-range indicator.

7. The 3D depth imaging system of claim 6, wherein the dashboard app includes a vehicle storage area capacity value, the vehicle storage area capacity value indicating a remaining capacity of the vehicle storage area.

8. The 3D depth imaging system of claim 7, wherein the out-of-range indicator causes the dashboard app to display an out-of-range message, the out-of-range message indicating that the 3D-depth camera is out of range with respect to the wall situated at the rear section of the vehicle storage area.

9. The 3D depth imaging system of claim 7, wherein the dashboard app includes a vehicle storage area capacity graph, the vehicle storage area capacity graph graphically indicating the vehicle storage area capacity value over one or more time values.

10. The 3D depth imaging system of claim 9, wherein the out-of-range indicator causes the dashboard app to not display the vehicle storage area capacity value.

11. The 3D depth imaging system of claim 9, wherein the out-of-range indicator causes the dashboard app to display a zero or default value for the vehicle storage area capacity value.

12. The 3D depth imaging system of claim 1, wherein the 3D image data is 3D point cloud data.

13. The 3D depth imaging system of claim 1, wherein the 3D image data is captured periodically.

14. The 3D depth imaging system of claim 13, wherein the 3D image data is captured at any of: every 30 seconds, every minute, or every two minutes.

15. A three-dimensional (3D) depth imaging method for use in commercial trailer loading, the 3D depth imaging method comprising:
   capturing, via a 3D-depth camera, 3D image data of a vehicle storage area, the 3D-depth camera oriented in a direction to capture the 3D image data of the vehicle storage area;
   analyzing, via one or more processors, the 3D image data with a depth-detection application (app), the depth-detection app determining, based on the 3D image data, a void data region and a floor data region, the void data region corresponding to a first region within a field of view of the 3D-depth camera that the 3D-depth camera at least one of did not read, scan, or sense detect, the floor data region corresponding to a second region within the field of view of the 3D-depth camera that corresponds to a floor area of the vehicle storage area; and
   generating, via the depth-detection app, an out-of-range indicator, the out-of-range indicator indicating that a wall situated at a rear section of the vehicle storage area is not detected.

16. The 3D depth imaging method of claim 15, wherein the 3D-depth camera and the one or more processors are housed in a mountable device.

17. The 3D depth imaging method of claim 15, wherein the wall may be any one of: a package wall or a wall of the vehicle storage area.

18. The 3D depth imaging method of claim 15, wherein the void data region is associated with a top area of the vehicle storage area.

19. The 3D depth imaging method of claim 15, wherein the floor data region is associated with a floor area of the vehicle storage area.

20. The 3D depth imaging method of claim 15 further comprising receiving, via a dashboard app executing on a client device, the out-of-range indicator.

21. The 3D depth imaging method of claim 20, wherein the dashboard app includes a vehicle storage area capacity value, the vehicle storage area capacity value indicating a remaining capacity of the vehicle storage area.

22. The 3D depth imaging method of claim 21, wherein the out-of-range indicator causes the dashboard app to display an out-of-range message, the out-of-range message indicating that the 3D-depth camera is out of range with respect to the wall situated at the rear section of the vehicle storage area.

23. The 3D depth imaging method of claim 21, wherein the dashboard app includes a vehicle storage area capacity graph, the vehicle storage area capacity graph graphically indicating the vehicle storage area capacity value over one or more time values.

24. The 3D depth imaging method of claim 23, wherein the out-of-range indicator causes the dashboard app to not display the vehicle storage area capacity value.

25. The 3D depth imaging method of claim 23, wherein the out-of-range indicator causes the dashboard app to display a zero or default value for the vehicle storage area capacity value.

26. The 3D depth imaging method of claim 15, wherein the 3D image data is 3D point cloud data.

27. The 3D depth imaging method of claim 15, wherein the 3D image data is captured periodically.

28. The 3D depth imaging method of claim 27, wherein the 3D image data is captured at any of: every 30 seconds, every minute, or every two minutes.

* * * * *